United States Patent
Solomon

(10) Patent No.: US 6,739,139 B1
(45) Date of Patent: May 25, 2004

(54) HEAT PUMP SYSTEM

(76) Inventor: Fred D. Solomon, 1297 High St., Apt. #110, Wadsworth, OH (US) 44281

(*) Notice: Subject to any disclaimer, the term of this patent is extended or adjusted under 35 U.S.C. 154(b) by 0 days.

(21) Appl. No.: 10/447,369

(22) Filed: May 29, 2003

(51) Int. Cl.[7] ............................................. F25B 9/00
(52) U.S. Cl. ............................................ 62/6; 62/324.6
(58) Field of Search ........................ 62/323.1, 324.1, 62/324.6, 501, 238.4, 6, 324.2

(56) References Cited

U.S. PATENT DOCUMENTS

| | | | | |
|---|---|---|---|---|
| 4,055,056 A | * | 10/1977 | Perkins | 62/324.6 |
| 4,178,768 A | * | 12/1979 | Pauliukonis | 62/160 |
| 4,226,091 A | * | 10/1980 | Nowacki | 62/323.1 |
| 4,308,001 A | * | 12/1981 | Hofbauer et al. | 417/364 |
| 4,666,376 A | | 5/1987 | Solomon | 417/379 |
| 5,129,236 A | | 7/1992 | Solomon | 62/324.1 |
| 5,275,014 A | | 1/1994 | Solomon | 62/324.1 |
| 5,313,874 A | * | 5/1994 | Lackstrom | 91/459 |
| 5,725,365 A | | 3/1998 | Solomon | 417/552 |

FOREIGN PATENT DOCUMENTS

| | | | |
|---|---|---|---|
| DE | 263641 A | * | 2/1978 |
| DE | 003217126 A1 | * | 11/1983 |
| DE | 3300199 a | * | 7/1984 |
| FR | 2673979 A1 | * | 9/1992 |

* cited by examiner

*Primary Examiner*—William E. Tapolcai
*Assistant Examiner*—Mohammad M. Ali
(74) *Attorney, Agent, or Firm*—Renner, Kenner, Greive, Bobak, Taylor & Weber

(57) ABSTRACT

A heat pump system (10) including a heat generator (15), a heat engine (26) supplied with heat engine working fluid (18) by the heat generator (15) having a heat engine cylinder chamber (34), a heat engine piston (32), and a heat engine piston rod (35), a preheating chamber (31) employing the heat engine working fluid (18) to heat the heat engine cylinder chamber (34), a compressor (40) driven by the heat engine (26) employing compressor working fluid having a compressor cylinder chamber (46), a compressor piston (44), and a compressor piston rod (47), a spacer (50) separating and joining the heat engine piston rod (35) and the compressor piston rod (47), a sealing assembly (38) associated with the spacer (50) separating the heat engine working fluid (18) and the compressor working fluid, and a valve assembly (60) communicating with the heat engine cylinder chamber (34) and controlling the ingress and egress of heat engine working fluid (18) to the heat engine (26).

10 Claims, 8 Drawing Sheets

HEAT PUMP SYSTEM

TECHNICAL FIELD

In general, the present invention relates to a heat pump system capable of providing heating and cooling requirements for residential and other applications. More particularly, the invention relates to a heat pump system providing such heating and cooling by employing a heat engine. More specifically, the invention relates to a heat pump system in which such a heat engine interacts with the remainder of the system in such a manner as to provide greatly improved efficiency and other performance characteristics.

BACKGROUND ART

Heat pumps have long been known and employed in the heating, ventilating, and air conditioning industry. A significant reason for the extensive use and focus of attention on heat pump systems is that the same components may be employed to effect both heating and cooling operations, whereas most other systems require a substantial number of separate equipment components for carrying out heating and cooling functions. Classically, heat pump systems employ a compressor which is operated by an electric motor to circulate refrigerant through a condenser which converts a gaseous form of the refrigerant to a liquid and an evaporator which absorbs heat from or imparts heat to an area to be cooled or heated, respectively.

For the most part, advancements in heat pump system technology have been directed to the development of improved working fluids and system components. In the case of working fluids, different refrigerants and particularly different fluorocarbon compounds have been developed which exhibit optimum performance characteristics in particular equipment or operating ranges. In regard to system components, efforts have been made to improve the operation and efficiency of the compressor, condenser, evaporator, and other ancillary components of these systems. However, due to the relatively advanced age and state of development of this technology, only minor improvements in operation and efficiency have been achieved through research and development efforts of this nature in recent years.

Attempts have been made to develop heat pumps which are heat driven. In this respect, engine driven and absorption type heat pumps represent examples of efforts of this type. Heat driven heat pumps of these types have not achieved commercial acceptance and recognition for a number of reasons. In general, devices of this nature tend to be highly complex systems having component elements which are both sophisticated and expensive. In addition, many of these systems contemplate the use of working fluids which are other than conventional refrigerants, such as ammonia or lithium bromide. Due to the fact that ammonia, for example, is considered to be a noxious gas, the use of nonconventional working fluids of this nature requires radically new and different capabilities and equipment with respect to installation, repair and service personnel that is not normally involved in the heating, ventilating, and air conditioning industry. With the technical limitations on working fluid and component improvements and the lack of commercial acceptance of heat driven heat pump systems, these systems have remained in essentially the same state of technological development for a substantial number of years.

Heat driven heat pumps employing heat engines and conventional working fluids have been developed but typically suffer from a number of disadvantages. For example, at the end of each power stroke of a heat engine piston, fluid at a high temperature of perhaps 300° F. and a high pressure of perhaps 160 p.s.i. remains in the heat engine cylinder. When this fluid is discharged into a condenser there is a loss of a significant amount of kinetic and thermal energy, thereby rendering the overall system highly inefficient.

Another problem area in such heat driven heat pumps is that it is desirable to combine the heat engine and compressor within a single housing having a piston rod connecting the heat engine piston and the compressor piston. Since the optimum characteristics for the working fluids in the heat engine and the compressor are substantially different, it is necessary to employ two different refrigerants. Under these circumstances, it is a common problem to have the higher pressure working fluid eventually migrate through any seals into the lower pressure working fluid and thereby adversely alter the operating characteristics of the lower pressure working fluid.

A further difficulty in the design of heat engines is in providing a valve to effect shifting between high vapor pressure power stroke and exhaust stroke. When a conventional valve shifts, it allows vapor to blast into the cylinder so rapidly that it induces the entire heat pump to vibrate or shake violently, thereby shortening the life of the heat engine and being otherwise objectionable. Efforts to slow the valve shift motion have been unsuccessful because vapor will leak by the valve when it slowly passes from high vapor pressure position to the exhaust position.

Another notorious problem with heat engines is in effecting start-up if the unit has not been running and is cold. When the power section heat generator or evaporator first begins to deliver hot vapor to the power chamber of the heat engine, it condenses before it can drive the piston. Since there is a limited amount of working fluid in the heat generator it can run low on working fluid before the power chamber of the heat engine reaches operating temperature. This causes overheating of the heat generator and possible scorching of the working fluid, thereby requiring major servicing before the heat pump can resume normal operation.

As a result of various of the above factors or combinations thereof, heat driven heat pump systems have not achieved any extent of commercial acceptance.

DISCLOSURE OF THE INVENTION

Therefore, an object of the present invention is to provide a heat pump system which may be exclusively heat driven. Another object of the invention is to provide such a heat pump system wherein the working fluid in a power section is vaporized in a heat generator or evaporator by any heat source, such as a high efficiency gas boiler. Still another object of the invention is to provide such a heat pump system that lends itself to alternate energy assistance or powering, such as the incorporation of solar, biogas or other sources available to create heat energy.

Another object of the present invention is to provide a heat pump system wherein the heat engine of the power section and the compressor of the compressor section constitute a combined or consolidated unit. Another object of the invention is to provide such a combined heat engine and compressor assembly which does not require a fluid interconnection between the engine and the compressor. Still another object of the present invention is to provide such a combined heat engine and compressor assembly wherein the pistons of the heat engine and the compressor are mechanically interconnected. Yet another object of the present invention is to provide such a combined heat engine and compressor assembly which prevents migration of working fluid from the high pressure side to the low pressure side by employing two spaced rolling diaphragm seals having pressurized water therebetween, both the diaphragms and the water combining to constitute an effective barrier to refrigerant migration.

A further object of the present invention is to provide a heat pump system wherein a unique valve controls the ingress and egress of fluids into the chamber housing the heat engine piston. Another object of the invention is to provide such a valve which provides transition between the power and exhaust strokes by smooth, positive motion which prevents any bleedover when the piston power chamber is shifted between exhaust and high pressure operating conditions. Still another object of the present invention is to provide such a valve which does not require either electrical or mechanical shifting mechanisms to effect operation of the valve.

Another object of the present invention is to provide a heat pump system which automatically solves cold startup problems normally encountered when a system has not been running and the heat engine is at ambient temperature. Another object of the present invention is to provide a preheat chamber adjacent to the cylinder of the heat engine which receives vapor from the heat generator and returns condensate to the heat generator until the heat engine cylinder is sufficiently hot, such that the system can be started with the hot vapor immediately driving the piston in a power stroke. A further object of the invention is to provide such a preheat chamber which is an annular column surrounding a ceramic cylinder wall which is heated by conduction from the hot vapor in the annular preheat chamber. Yet a further object of the invention is to provide such a preheat chamber which is disposed above the heat generator producing the hot vapor working fluid which is arranged such that any condensate initially forming in the preheat chamber is returned solely by gravity to the heat generator for reconversion to hot vapor.

Still a further object of the present invention is to provide a heat pump system wherein kinetic energy from the exhaust at the end of the power stroke of the heat engine piston is employed to assist the power stroke. Another object of the invention is to employ the exhaust from the heat engine to operate a turbine driving a pump which creates a vacuum condition on the back side of the heat engine piston to assist in the power stroke of the heat engine piston. A further object of the present invention is to provide a turbo impeller and pump arrangement which may be energized solely by vapor exiting the heat engine chamber or which can be supplemented by an electric motor or solar powered motor to further increase operating efficiency of the heat engine.

Yet a further object of the invention is to provide such a heat pump system wherein all moving parts and sealing areas can be constructed of relatively low-cost ceramic materials due to the fact that the entire system operates at relatively low temperatures. A further object of the present invention is provide such a heat pump system wherein the ceramic materials used for the moving parts and sealing areas increase efficiency of the heat pump system by providing for fluid-tight but low friction sliding engagement. A further object of the invention is to provide such a heat pump system which may employ a working fluid in the heat engine section which requires substantially less heat per hour for conversion to vapor, thus representing a substantial increase in overall efficiency of the heat pump system.

Yet still another object of the invention is to provide a heat pump system wherein a condensate pump is used to transfer working fluid from the condenser to the heat generator in the heat engine system. A further object of the invention is to provide a heat pump system wherein the condensate pump is a piston-driven condensate pump. A further object of the invention is to provide a heat pump system wherein the piston of the piston-driven condensate pump is attached to the piston of the heat engine, and is thereby driven according to the movement of the compressor and heat engine pistons.

Yet still a further object of the invention is to provide a heat pump system which can readily employ a variety of heat exchangers and other design features which permit further optimizing the overall efficiency of both the heat engine system and the compressor system. A further object of the invention is provide a heat pump system wherein the heat exchanger is a triple-tube type and is used to heat water such as that contained in a swimming pool, hot water heater or the like. A further object of the invention is provide a heat pump system wherein the refrigerant from the compressor and the working fluid from the heat engine are directed to the triple-tube heat exchanger. A further object of the invention is provide a heat pump system wherein heat from the refrigerant and from the working fluid is transferred to water from the swimming pool, hot water heater or the like.

In general, the present invention contemplates a heat pump system including a heat generator, a heat engine supplied with heat engine working fluid by the heat generator having a heat engine cylinder chamber, a heat engine piston, and a heat engine piston rod, a preheating chamber employing the heat engine working fluid to heat the heat engine cylinder chamber, a condensate pump supplying said heat generator with heat engine working fluid, a compressor driven by the heat engine employing compressor working fluid having a compressor cylinder chamber, a compressor piston, and a compressor piston rod, a spacer separating and joining the heat engine piston rod and the compressor piston rod, a sealing assembly associated with the spacer separating the heat engine working fluid and the compressor working fluid, and a valve assembly communicating with the heat engine cylinder chamber and controlling the ingress and egress of heat engine working fluid to the heat engine.

BEST MODE FOR CARRYING OUT THE INVENTION

Figure 1:
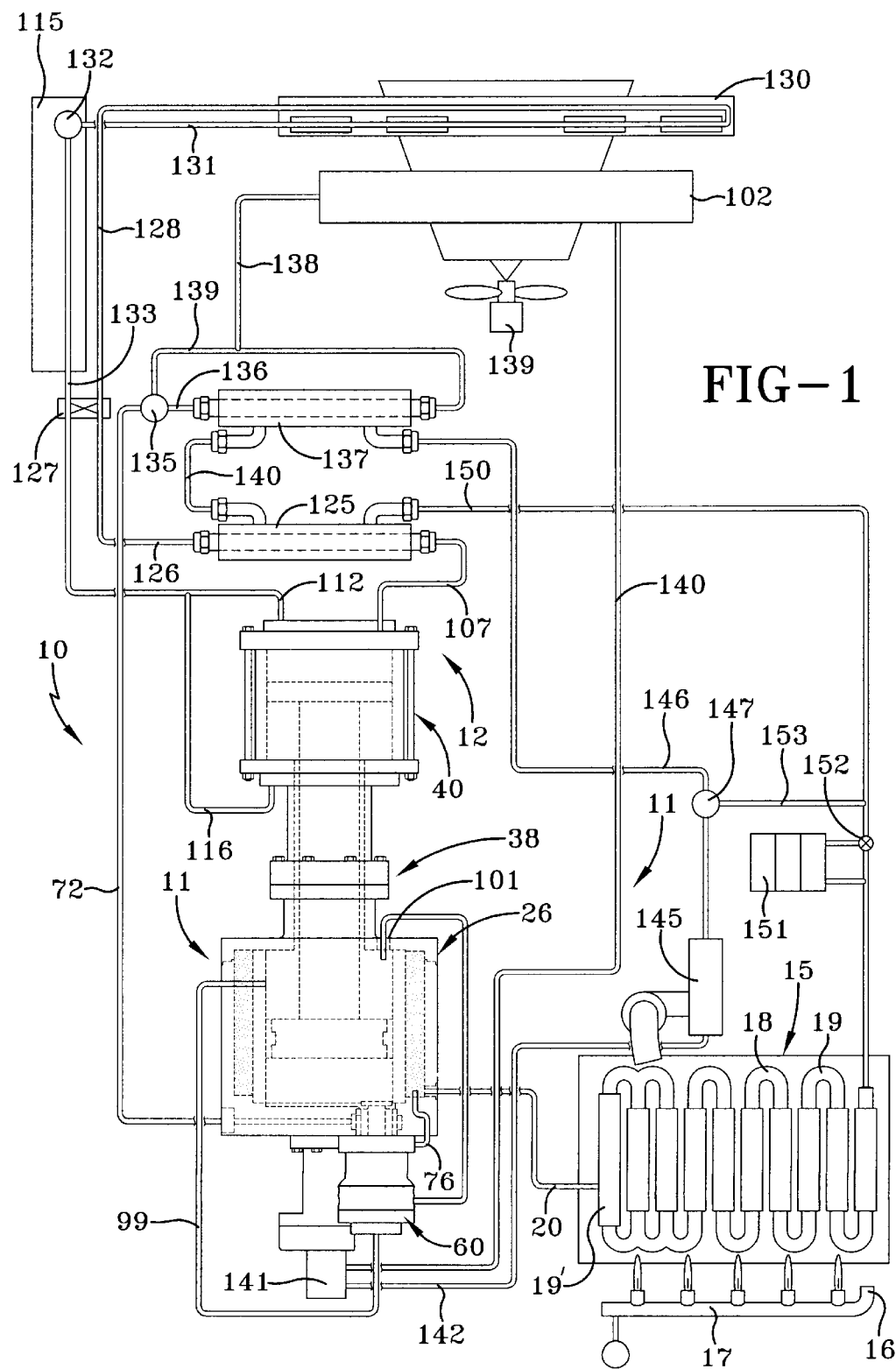
FIG. 1 is a largely schematic depiction of an exemplary heat pump system embodying the concepts of the present invention, showing the interconnection of the primary components.

An exemplary heat pump system embodying the concepts of the present invention is generally indicated by the numeral 10 in FIG. 1 of the drawings. While the exemplary heat pump system 10 shown and described herein is particularly applicable to a three-ton unit of a type which might be employed for residential purposes, larger or smaller units can be employed depending upon the requirements and the invention may be readily adapted to vehicles or other applications, particularly in instances where excess heat may be available.

The heat pump system 10 has a power section, generally indicated by the numeral 11, which drives and otherwise interrelates with a compressor section, generally indicated by the numeral 12. As will be appreciated from the following description, the power section 11 employs a Rankin cycle, and the compressor section 12 employs a vapor compression cycle. As a result, differing working fluids are employed in the power section 11 and the compressor section 12 as detailed hereinafter. The power section 11 has a conventional heat generator or evaporator, generally indicated by the numeral 15 which receives a fuel and air mixture through a fuel inlet line 16 which is ignited by a burner 17 to heat a working fluid 18 in a series of finned coils 19 in the generator 15. While the arrangement shown in FIG. 1 contemplates usage of a conventional high efficiency natural gas or propane fired heat generator, it is to be appreciated that other heat sources could be employed, such as a gas boiler or the like, depending upon fuel availability and related considerations to effect heating of liquid working fluid 18 in coils 19 to produce a saturated vapor condition in expansion chamber 19' of the generator 15.

A preferred working fluid for the power section 11 to achieve maximum efficiency is a refrigerant wherein the latent heat stored in the liquid to make it boil must be very low. A particularly suitable product is HFC-72, which provides a 40% gain in efficiency over the conventional R113 refrigerant, which might also be used in the instant invention. It is also to be appreciated that other fluoro-chloro hydrocarbon compounds or other refrigerants with similar characteristics could be employed for practice of the present invention.

Figure 2:
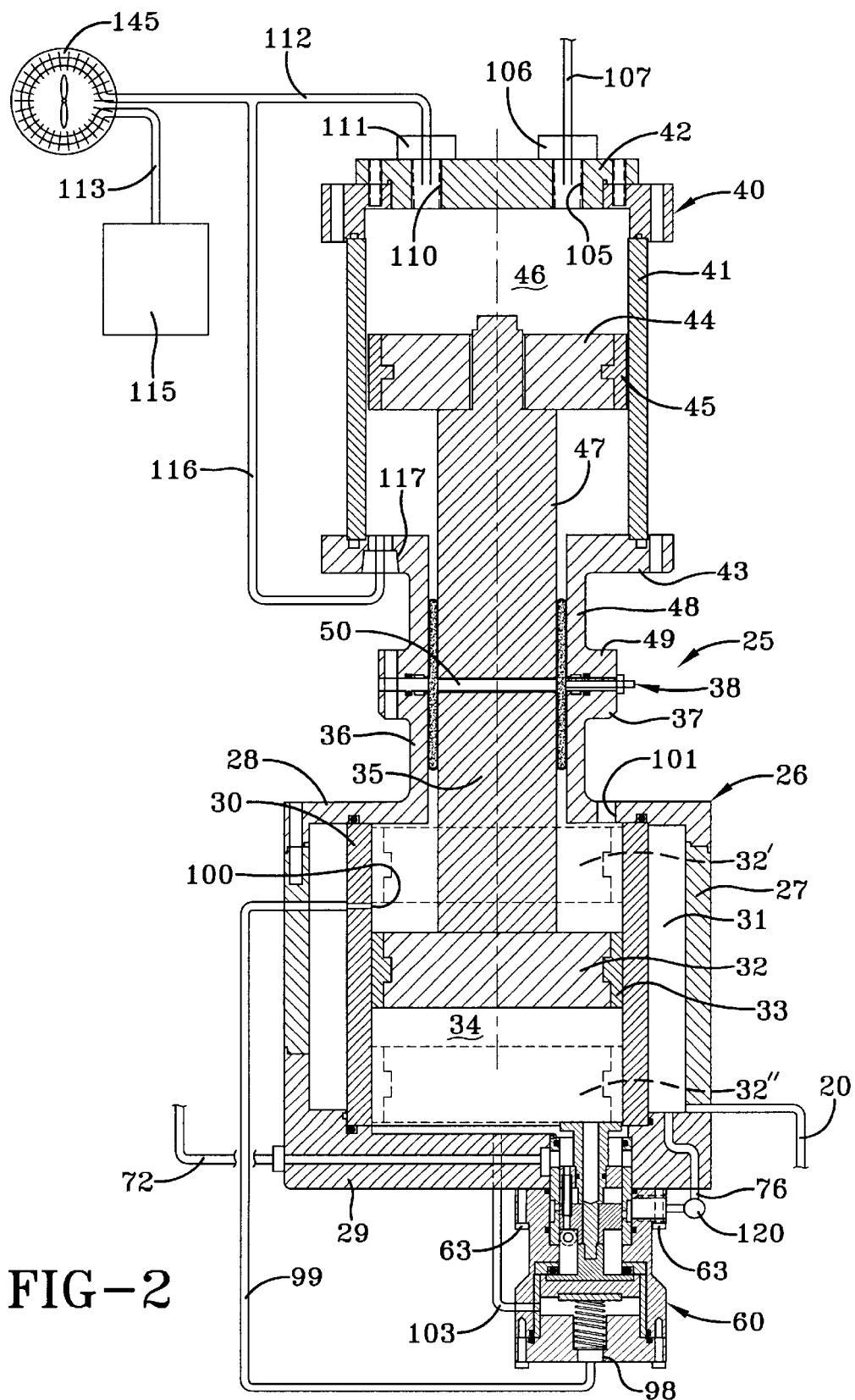
FIG. 2 is an enlarged partially schematic cross-sectional view of the combined heat engine and compressor assembly of FIG. 1.

The hot vaporized working fluid 18 is supplied from the expansion chamber 19' of the generator 15 via a power section high pressure gas line 20 to a combined heat engine and compressor assembly, generally indicated by the numeral 25. As shown in FIGS. 1 and 2, the heat engine and compressor assembly 25 has a heat engine section, generally indicated by the numeral 26, which has an enlarged cylinder housing 27 that it generally cylindrical. The heat engine section 26 has an upper end cap 28 and a lower end cap 29, thereby forming with the housing 27 an enclosed heat engine section 26. Spaced radially inwardly of the cylindrical housing 27 is an inner cylinder wall 30 which extends between upper end cap 28 and lower end cap 29. An annular preheating chamber 31 is thus formed between the cylindrical housing 27 and the inner cylinder wall 30. The inner cylinder wall 30 is preferably constructed of a ceramic material such as alumina silicate or other material having a smooth surface and a capability to conduct heat. Reposing within the inner cylinder wall 30 is a heat engine piston 32. The piston 32 may advantageously have a radial outer facing 33 which may similarly be made of the ceramic employed for inner cylinder wall 30 for fluid-tight but low friction sliding engagement with the cylinder wall 30.

The preheating chamber 31 is instrumental in overcoming the cold start problems which normally plague thermal heat pumps. Before the solenoid (not shown) is opened to turn the heat engine and compressor assembly to the operating position, the generator 15 is actuated to produce hot vapor which is transferred via high pressure gas line 20 to the preheating chamber 31. Initially, this hot vapor is condensed by the cold walls of the preheating chamber 31. This condensed liquid then flows back down the high pressure gas line by gravity feed due to the strategic placement of the generator 15 below the preheating chamber 31. The condensed vapor is then again reconverted to a heated high pressure gas in the expansion chamber 19' and is again transferred via the high pressure gas line 20 to the preheating chamber 31. Eventually, the preheating chamber 31 reaches substantially the same temperature as the coils 19 in generator 15 and the condensation in the preheating chamber 31 ceases. At that time, the solenoid is opened to commence operation of the heat engine and compressor assembly 25. Significantly, the heat in the preheating chamber 31 is conducted through the ceramic inner cylinder wall 30 to the facing 33 and piston 32, as well as cylinder chamber 34 of heat engine section 26. The preheating chamber 31 also serves as an expansion tank which stores hot pressurized vapor which is ready for use in heat engine section 26 immediately upon the institution of operation of the heat engine and compressor assembly 25.

Figure 3:
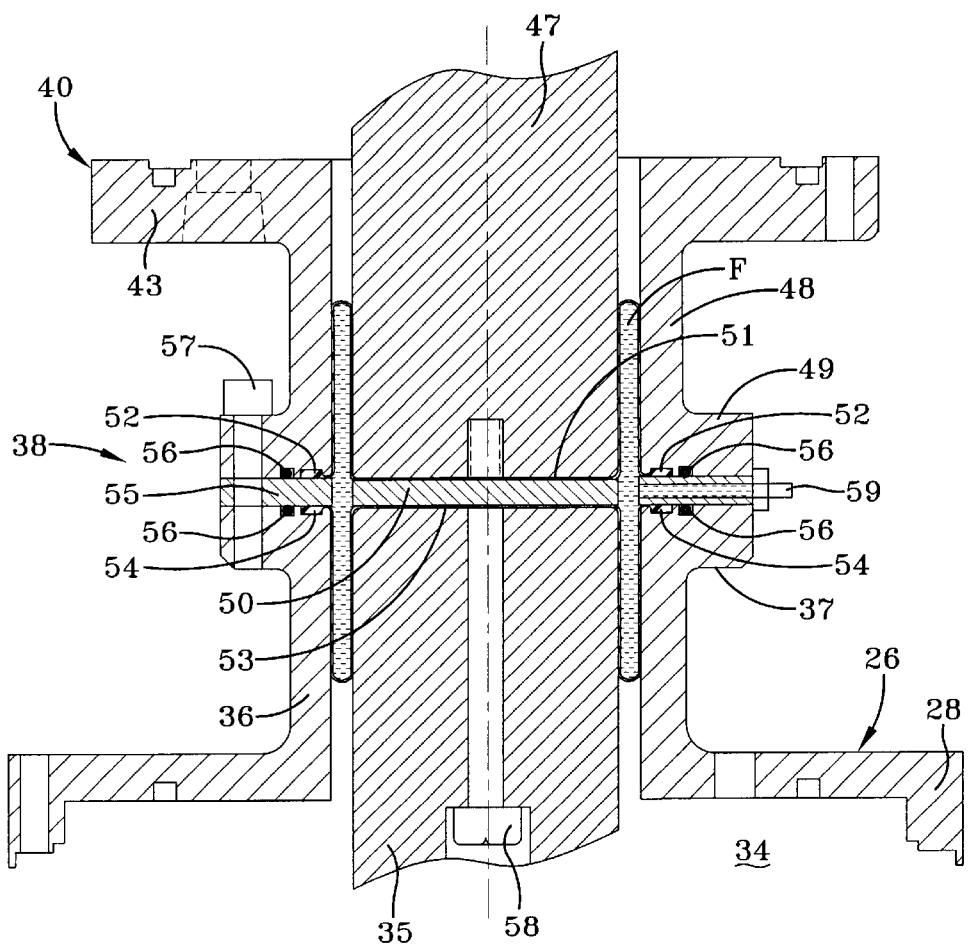
FIG. 3 is an enlarged partially schematic cross-sectional view of the sealing assembly for the piston rod connecting the piston of the heat engine and the piston of the compressor assembly.

Referring now to FIGS. 2 and 3, the heat engine piston 32 is connected to a heat engine piston rod 35 which extends upwardly in the heat engine cylinder chamber 34. The upper end cap 28 of heat engine section 26 has an axially extending and cylindrical neck 36 which receives the heat engine piston rod 35. The cylindrical neck 36 terminates in a radially extending flange 37, which is part of a sealing assembly, generally indicated by the numeral 38.

The heat engine piston rod 35 of heat engine section 26 is interconnected with a compressor, generally indicated by the numeral 40, of combined heat engine and compressor assembly 25. The compressor 40 is in various respects similar to the heat engine 26 in its structural configuration. In particular, the compressor 40 has a cylinder housing 41 which is generally cylindrical. Compressor 40 has an upper end cap 42 and a lower end cap 43, thereby forming with the cylinder housing 41 an enclosed compressor 40. Reposing within the cylinder housing 41 is a compressor piston 44. The compressor piston 44 may be provided with a radially outer facing 45 similar to the facing 33 of heat engine piston 32. In a manner similar to the heat engine section 26, the cylinder housing 41 and the facing 45 of piston 44 may be made of a ceramic for a fluid-tight but low friction sliding engagement, as described above, in conjunction with inner cylinder wall 30 and facing 33 of the heat engine section 26. The cylinder housing 41 and upper end cap 42 and lower end cap 43 define a compressor cylinder chamber in which the compressor piston 44 moves.

The compressor piston 44 is connected to a compressor piston rod 47 which extends downwardly in the compressor cylinder chamber 46. The lower end cap 43 has an axially extending cylindrical neck 48 which receives the compressor piston rod 47. Cylindrical neck 48 terminates in a radially extending flange 49 which is adapted to matingly engage the flange 37 of upper end cap 28 of the heat engine section 26, thus forming another element of sealing assembly 38. The upper end of heat engine piston rod 35 and the lower end of compressor piston rod 47 are separated by a circular spacer 50.

Sealing assembly 38 also has a first elastomeric diaphragm 51 positioned between the circular spacer 50 and the end of compressor piston rod 47, extending between compressor piston rod 47 and the cylindrical neck 48 of lower end cap 43 and into the radial surface of flange 49 where it terminates in a peripheral bead 52. A second elastomeric diaphragm 53 is interposed between circular spacer 50 and the top of heat engine piston rod 35, extends between the piston rod 35 and the cylindrical neck 36 of upper end cap 28 and into the radial surface of flange 37 where it terminates in a peripheral bead 54. The beads 52 and 54 are spaced by an annular insert 55 which is of substantially the same thickness as the circular spacer 50. The first diaphragm 51 and second diaphragm 53 have circumferential seals 56 between annular insert 55 and radial surfaces of the flanges 49 and 37, respectively. Once assembled as depicted in FIG. 3 with the pistons 32 and 44 at substantially midstroke within the cylinder chambers 34 and 46, the flanges 37 and 49 are coupled, as by a plurality of fasteners 57 such as machine screws or other coupling elements. Once the diaphragms 51 and 53 are installed as depicted in FIG. 3, the piston rods 35 and 47 are joined by a fastener 58 which clamps the circular spacer 50 and the diaphragms 51 and 53 in the position depicted in FIG. 3. The diaphragms 51, 53 operate as conventional rolling diaphragms with movement of the piston rods 35,47. While diaphragms 51,53 may be constructed of fabric-reinforced low fluid permeation elastomers, such may not in and of itself preclude migration of working fluid between the compressor section and the heat engine section over a period of years with many millions of operating cycles.

In the preferred form of the present invention, a fluid F is interposed between the diaphragms 51 and 53 in the area between the pistons 35 and 47 and the cylindrical necks 36 and 48 of upper end cap 28 and lower end cap 43, respectively. It has been determined that an effective seal between compressor cylinder chamber 46 and heat engine cylinder chamber 34 can be achieved by employing the fluid F at a pressure of approximately 150 p.s.i. or as appropriate for the pressure ranges in the power section 11 and compressor section 12 of a particular heat pump system 10. A preferred fluid F for the instant system is water or another fluid which will not absorb the freon molecules that tend to migrate from refrigerants. The ingress and egress of fluid F to the area between diaphragms 51 and 53 is effected by a fill tube 59 located in the annular insert 55.

Figure 4:
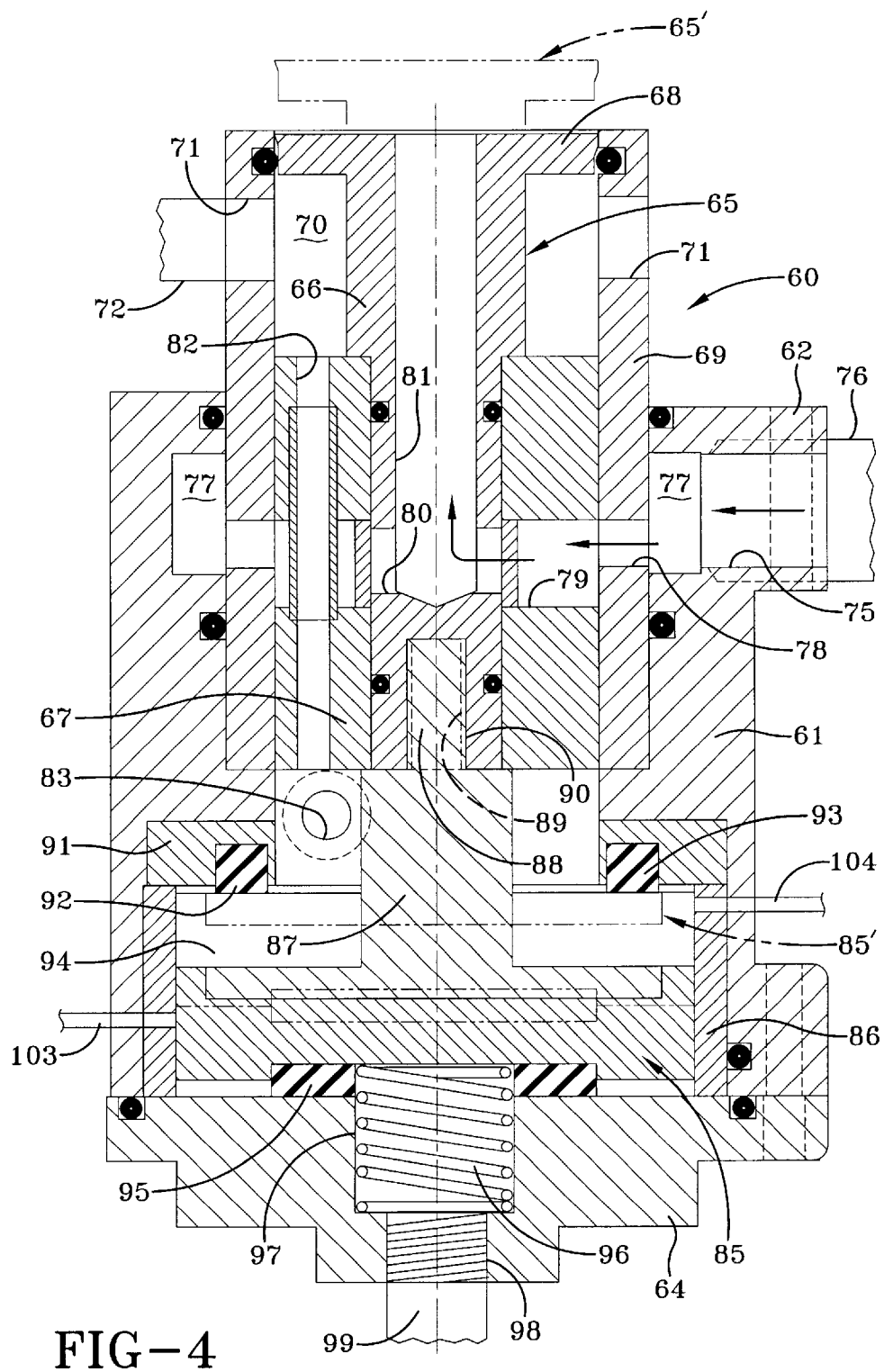
FIG. 4 is an enlarged partially schematic cross-sectional view of the valve controlling the ingress and egress of working fluids to the heat engine piston chamber as a function of location of the power piston.

The saturated vapor from the heat generator 15 is introduced into and exhausted from the heat engine section 26 of the heat engine and compressor assembly 25 via a valve assembly, generally indicated by the numeral 60. Referring particularly to FIGS. 1, 2 and 4 of the drawings, the valve assembly 60 may conveniently be mounted on the heat engine section 26 and, particularly, the lower end cap 29 for direct communication with the cylinder chamber 34 of heat engine section 26. As shown, the valve assembly 60 has a generally cylindrical housing with a plurality of bores 62 which receive fasteners such as machine screws 63 which extend therethrough into the lower end cap 29 of the heat engine section 26. Valve assembly 60 also has a base 64 which, with housing 61 and lower end cap 29, defines a closed chamber selectively communicating with cylinder chamber 34 of heat engine section 26.

The valve assembly 60 includes a valve element, generally indicated by the numeral 65. The valve element 65 has an elongate cylindrical stem 66. The stem 66 carries an inlet control piston 67 at one extremity thereof and a flow control spool gate 68 at the other extremity thereof. Both the inlet control piston 67 and the spool gate 68 operate relative to a sleeve 69 positioned within the housing 61 of valve assembly 60. Both the inlet control piston 67 and the sleeve 69 may advantageously be made of the ceramic material discussed hereinabove for a fluid-tight but low friction sliding engagement between these members. The upper portion of the valve stem 66, the sleeve 69 and the space between the lower side of spool gate 68 and upper surface of the inlet control piston 67 define a heat engine exhaust chamber 70. The heat engine exhaust chamber 70 communicates with one or more heat engine exhaust ports 71 which are interconnected with a heat engine exhaust line 72.

The high pressure, high temperature working fluid 18 for powering the heat engine section 26 is supplied to a high pressure gas inlet port 75. As shown, the high pressure gas inlet port is fed by a high pressure gas line 76 which, as shown, may originate in preheating chamber 31 (FIG. 2). Alternatively, the high pressure gas inlet line 76 could originate at the heat generator 15 or be a branch line of the high pressure gas line 20. The high pressure gas inlet port 75 communicates with a gland 77 formed in housing 61 which extends circumferentially about the entirety of the sleeve 69. In this manner, the sleeve 69 and the inlet control piston 67 may be preheated and heated to minimize the possible formation of condensate in the valve assembly 60. Communicating with the gland 77 is a sleeve inlet duct 78. The sleeve inlet duct 78 communicates with a piston inlet duct 79 as seen in FIG. 4 when valve element 65 is in the power stroke position depicted therein. The piston inlet duct 79 does not communicate with sleeve inlet duct 78 when valve element 65 is in the exhaust position 65' depicted in chain lines in FIG. 4 and the position shown in FIG. 2. The piston inlet duct 79 communicates with a cylinder stem inlet duct 80 that joins an input bore 81 in the upper end of cylinder stem 66 which communicates with the interior of cylinder chamber 34 of heat engine section 26. It is to be further appreciated that when the valve element 65 is in the exhaust position 65' of FIG. 4, the exhaust chamber 70, and thus the heat engine exhaust line 72, is in open communication with the heat engine cylinder chamber 34. The inlet control piston 67 may also be provided with a through vent 82 which extends axially the length of inlet control piston 67 to a vent hole 83 which is connected to the engine condenser 102 to preclude pressure buildup which might be occasioned by fluid leakage in valve assembly 60.

The lower portion of housing 61 of valve assembly 60 as viewed in FIG. 4 carries a pilot piston 85. A pilot piston sleeve 86 surrounds the pilot piston 85 throughout the extent of its vertical movement. The pilot piston 85 and pilot piston sleeve 86 may similarly be made of the ceramic discussed hereinabove for a fluid-tight but low friction sliding engagement between pilot piston 85 and pilot piston sleeve 86. The pilot piston 85 carries an integrally formed stem extension 87 which is of a generally inverted T-shaped configuration. The stem extension 87 has a projecting coupler 88 which is cylindrical and has threads 89 on its outer surface. The cylinder stem 66 has a bore 90 which is internally threaded to threadingly receive the projecting coupler 88 of pilot piston 85. The stem extension 87 is constructed of a ferrous metal material for purposes which will become apparent in the following discussion.

Mounted within housing 61 adjacent to and extending radially inwardly of pilot piston sleeve 86 is an annular magnet 91. The annular magnet 91 has a circumferential recess 92 which retains a toroidal bumper 93. The toroidal bumper 93 cushions the stoppage of pilot piston 85 and thus, valve element 65, when it moves upwardly to the exhaust position depicted as 65' in FIG. 4.

The lower side of pilot piston 85 opposite the stem extension 87 carries an annular bumper block 95 which cushions the arrival of pilot piston 85 in the power stroke position of valve assembly 65 depicted in solid lines in FIG. 4. A compression spring 96 is mounted in a bore in the base 64 of valve assembly 60. The spring 96 balances the piston to slow its vertical descent to the power stroke position depicted in solid lines in FIG. 4 when the magnet 91 releases the pilot piston 85.

The bore 97 housing spring 96 communicates with a pilot shift line inlet port 98 in housing 61 of valve assembly 60. A pilot shift line 99 extends from the pilot shift line inlet port 98 to a port 100 in the heat engine cylinder chamber 34 (FIG. 2). The port 100 is located in the inner cylinder wall 30 defining the heat engine cylinder chamber 34 at a position vertically, as viewed in FIG. 2, just below the heat engine piston 32 in the chain line position 32' depicting the end of the upward power stroke of the piston 32.

In operation, the valve assembly 60 operates in conjunction with the heat engine and compressor assembly 25 in the following manner, as particularly depicted in FIGS. 2 and 4. Just prior to commencement of the power stroke of the heat engine section 26, the heat engine piston 32 reposes at the bottom of heat engine cylinder chamber 34 in the chain line position depicted as 32". The valve assembly 60 is in the power stroke position depicted in solid lines in FIG. 4 with the piston 32 having displaced valve element 65 downwardly. The heat engine section has an outlet port 101 preferably in the upper end cap 28 which is connected to the valve assembly 60 (FIG. 1) to remove pressure from the area of heat engine cylinder chamber 34 above the heat engine piston 32.

Compressor 40 of heat engine and compressor assembly 25 contemporaneously has a compressor high pressure gas outlet port 105 with a compressor high pressure gas check valve 106 which is open and connected to the compressor high pressure gas line 107. The compressor high pressure gas outlet port 105 is located in the upper portion of compressor cylinder chamber 46 and preferably in the upper end cap 42. Also located in the upper end cap 42 is a compressor low pressure gas inlet port 110 which operates through a compressor low pressure gas check valve 111. The check valve 111 is connected to a compressor low pressure gas line 112 which is a return line from the indoor evaporator 115 (FIG. 1). At the commencement of the power stroke the compressor low pressure gas check valve 111 is in its closed position. As seen in FIGS. 1 and 3, the compressor low pressure gas line 112 splits into a branch low pressure gas line 116 which is connected to a compressor low pressure gas supply port 117 which communicates with the lower side of compressor piston 44 through positioning in lower end cap 43 of compressor 40. Low pressure gas is constantly supplied to low pressure gas supply port 117 throughout the operating cycle.

Once preheating is completed as described hereinabove, the power stroke is instituted by opening of a solenoid 120 in the high pressure gas inlet line 76. With the valve assembly 60 in the power stroke position, high pressure gas is supplied to heat engine cylinder chamber 34 below the heat engine piston 32 which is driven upwardly in the power stroke. The compressor piston 44 contemporaneously moves in its power stroke with the branch low pressure gas line 116 providing low pressure gas below compressor piston 44 to assist in the power stroke. During the power stroke, high pressure gas is forced from the compressor cylinder chamber 46 through compressor high pressure gas check valve 106 and into compressor high pressure gas line 107.

When the heat engine piston 32 approaches the end of the power stroke at the position 32', pilot shift line 99 is connected via port 100 so that the portion of heat engine chamber 34 below heat engine piston 32 transfers high pressure gas through the pilot shift line 99 into the valve assembly 60. The high pressure gas enters the pilot shift line inlet port 98 and operates on the pilot piston 85. The same pressure in heat engine cylinder chamber 34 operates on the upper surface of spool gate 68. Since the surface area of pilot piston 85 is substantially greater than the surface area of spool gate 68, valve assembly 60 necessarily moves upwardly to the exhaust position described hereinabove and depicted as position 65' of the valve element 65 in FIG. 4. This connects the heat engine cylinder chamber 34 with the heat engine exhaust line 72, as discussed hereinabove.

The compressor piston 44 reaches the end of its power stroke simultaneously at the top of the compressor cylinder chamber 46. At that time, the compressor high pressure check valve 106 closes and the compressor low pressure check valve 111 opens. Since the gas pressure is equal in compressor low pressure gas inlet line 112 and branch low pressure gas line 116, the pressure above and below compressor piston 44 is equalized. However, due to the greater working area for the fluid above the compressor piston 44 as compared to the working area on the lower surface of compressor piston 44, due to the compressor piston rod 47, the compressor piston 46 moves downwardly powering the engine piston 32 during the return or exhaust stroke of heat engine piston 32. During the exhaust stroke, the magnet 91 retains the pilot piston 85 and thus, valve element 65, in the exhaust position with assistance from the spring 96 of valve assembly 60. Additionally, a lockup line 103 (FIGS. 2 and 4) connects the bottom of heat engine cylinder chamber 34 with pilot piston chamber 94 which is below pilot piston 85 in the exhaust position 85' thereof. Thus, exhaust pressure is applied to the lower surface of pilot piston 85 to insure that pressure buildup in the condenser cannot, even on extremely hot days, cause the pilot piston 85 to shift out of the exhaust position prematurely.

Proximate the end of the exhaust stroke of heat engine piston 32, the lower surface of piston 32 physically engages the spool gate 68 of valve element 65 and slowly moves the valve element 65 from the exhaust position toward the power stroke position. Partial closure of the valve element 65 slows the descent of heat engine piston 32 while pressure builds under heat engine piston 32. The action of the heat engine piston 32 displaces the pilot piston 85 from engagement with the magnet 91. At that time, the spring 96 retards descent of the pilot piston 85 as it moves downwardly to engage bumper block 95 on the base 64 of valve assembly 60, thereby completing the exhaust stroke of heat engine piston 32. As the pilot valve 85 begins downward movement lockup line 103 is blocked off. Any excess air in pilot piston chamber 94 may escape via shift line 99 to the engine condenser 102. A vent line 104 to engine condenser 102 is also provided at the top of pilot piston chamber 94 which precludes any pressure buildup above pilot piston 85 even on extremely hot days (FIG. 4). At this point, the valve assembly 60 is in the power stroke position and a further cycle of the heat engine and compressor assembly 25 commences, as described hereinabove.

The flow of working fluid, normally R22, to and from the compressor section 40 is substantially in accordance with conventional heat pump operation and the principles described in my prior U.S. Pat. No. 5,129,236. As seen in FIG. 1, the high pressure refrigerant exiting compressor 40 into high pressure gas line 107 is directed through a heat exchanger operating as a desuperheater 125 where it is cooled somewhat by giving up heat to a liquid in a line of power section 11 as described hereinafter. The high pressure gas refrigerant exits desuperheater 125 in a high pressure reduced temperature gas line 126 which is connected with a four-way valve 127. The remainder of the compressor section 12 may constitute substantially conventional heat pump system components and operation, with four-way valve 127 providing the flow reversal function necessary to achieve both cooling and heating operations.

In the air conditioning or cooling operating mode, the four-way valve 127 effects connection of high pressure reduced temperature gas line 126 with a condenser gas line 128 which directs the gaseous refrigerant to a standard air conditioning condenser 130. The condenser 130 effects heat removal from the gaseous refrigerant to the ambient air with the refrigerant being converted to a liquid. The liquid exits the condenser 130 through a condenser liquid line 131 which directs the liquid refrigerant through an expansion check valve 132 to an evaporator 115 where the liquid refrigerant absorbs heat in air circulated through evaporator 115 from the area to be cooled and changes the refrigerant to a gas. The refrigerant exits evaporator 115 through an evaporator gas line 133 which is connected to four-way valve 127. The valve 127 in the cooling mode connects evaporator gas line 115 with compressor low pressure gas line 112 though which the refrigerant is returned to the compressor 40.

In the heating operating mode, the compressor 40 operates in the same manner. The four-way valve 127, in this instance, effects connection of high pressure reduced temperature gas line 126 with the evaporator gas line 133. The refrigerant gas in evaporator gas line 133 is introduced to evaporator 115 where it is condensed, giving up the latent heat of condensation to the air from the area to be heated. The refrigerant condensed to a liquid in evaporator 115 exits as a liquid through expansion check valve 132 into condenser liquid line 131 which directs the liquid refrigerant to the condenser 130. In the condenser 130 the liquid refrigerant is converted into gas by absorbing the requisite heat of vaporization from the ambient air and the rejected heat from condenser 130. The gaseous refrigerant formed in condenser 130 is discharged through condenser gas line 128 which is connected to four-way valve 127. The valve 127 in the heating mode connects condenser gas line 128 with compressor low pressure gas line 112 which returns the gaseous refrigerant to the compressor 40.

Referring to FIGS. 1 and 2 of the drawings, the working fluid 18 in the form of reduced temperature and reduced pressure gas in heat engine exhaust line 72 is directed to a three-way valve 135 which is normally connected to a heat engine recuperator gas input line 136 that directs the fluid to a heat engine recuperator 137 operating as a heat exchanger. The temperature of the gas is reduced with the other fluid passing through heat engine recuperator 137 being heated a comparable amount as set forth hereinafter. An engine condenser gas inlet line 138 directs the reduced temperature gas to the engine condenser 102. The engine condenser 102 may be a conventional air conditioning condenser, wherein ambient air is passed over the surface of coils containing the gas by a fan 139 to convert the gas into a liquid at a substantially reduced temperature.

In the heating mode, the three-way valve 135 may divert the gas in heat engine exhaust line 72 through a recouperator by-pass line 139 directly into engine condenser gas inlet line 138 and to the engine condenser 102. This results in no heat gain to the other fluid in the heat engine recouperator 137.

The condensate in engine condenser 102 exits through a condenser liquid outlet line 140 which is connected to a condensate pump 141. While various pumps might be employed, one example is the diaphragm pump design described in my prior U.S. Pat. No. 5,129,236. The condensate pump 141 employing such a diaphragm pump design is directly attached to the power section 11 and communicates with heat engine cylinder chamber 34 to derive its motive power.

Figure 6:
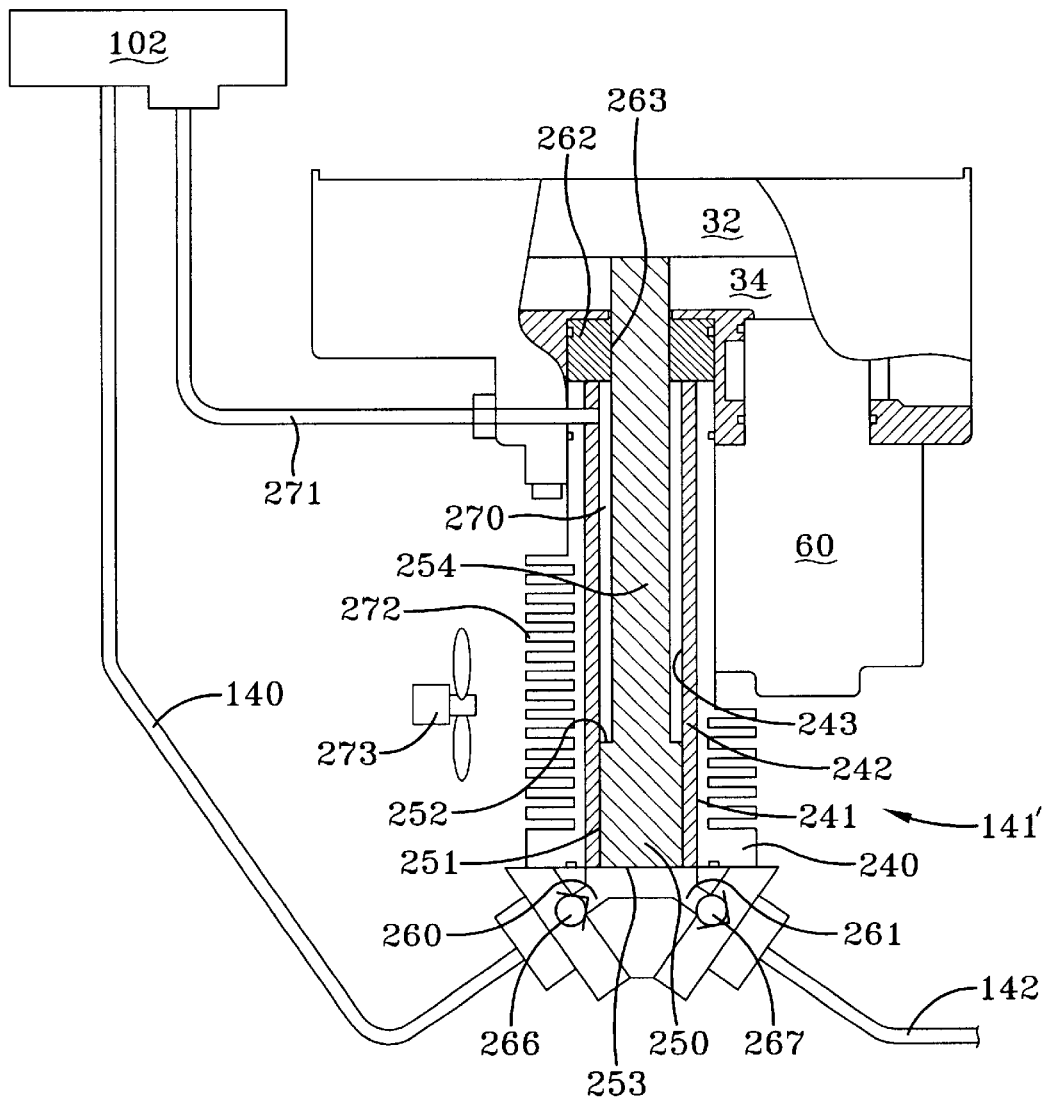
FIG. 6 is an elevational view of an alternative piston-driven condensate pump for the heat pump system at the end of the pump stroke with portions shown in cross-section and interconnections shown schematically.
Figure 7:
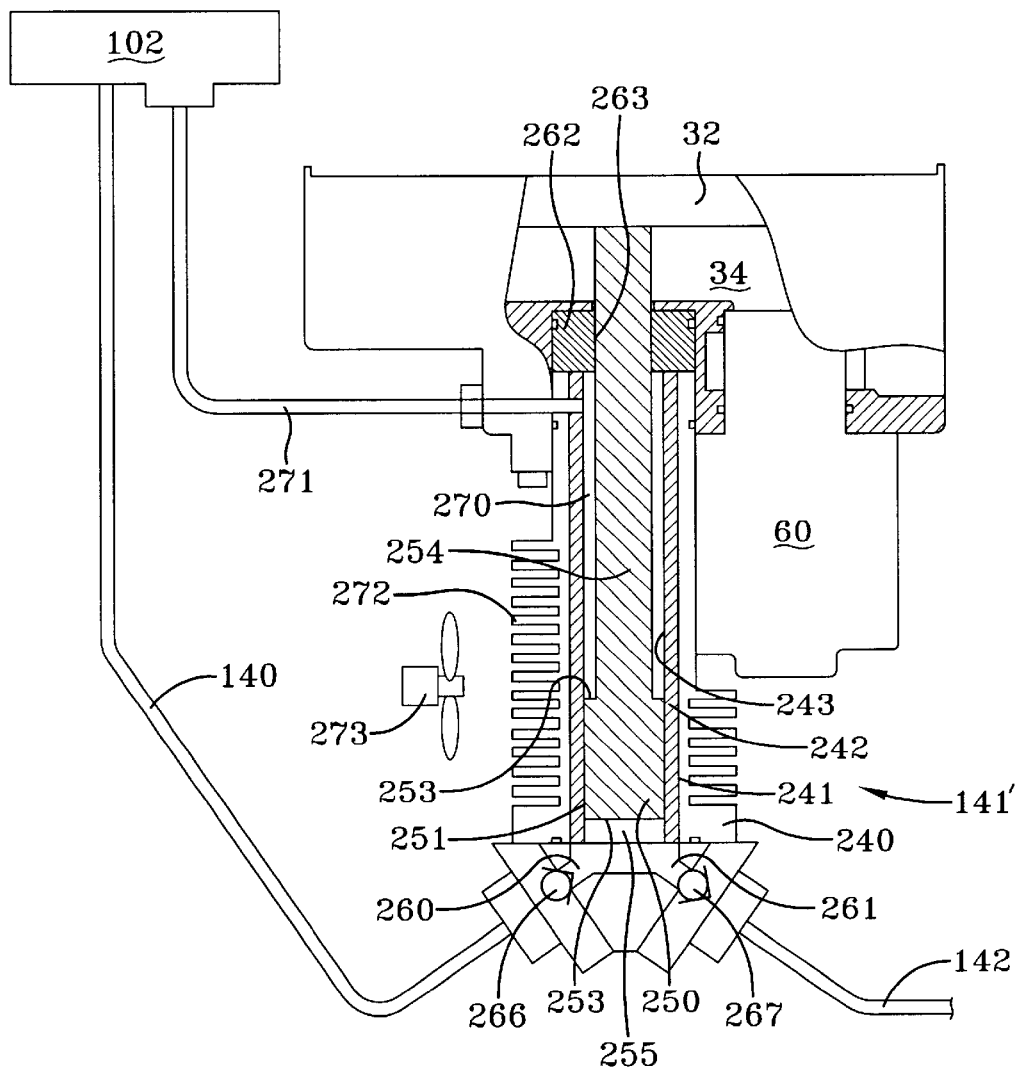
FIG. 7 is a view of the piston-driven condensate pump similar to FIG. 6 showing the piston at a different position in the pump stroke.

Alternatively, the condensate pump 141 can also be a piston-driven condensate pump, generally indicated by the numeral 141' in FIGS. 6 and 7. The piston-driven condensate pump 141' includes a housing 240 with a cylindrical cavity 241. A ceramic sleeve 242 having an inner surface 243 is received within the cylindrical cavity 241. A pump piston 250 having a top surface 252 and a bottom surface 253 is disposed within the ceramic sleeve 242. The pump piston 250 preferably has a radial outer facing 251 which may be made of the ceramic employed for inner surface 243 for a fluid tight but low friction sliding engagement with the inner surface 243 of sleeve 242. As will be discussed hereinbelow, the pump piston 250 reciprocates within the ceramic sleeve 242 to effectuate the pumping action of condensate pump 141'.

The top surface 252 of pump piston 250 is attached to one end of a driven shaft 254. The other end of the driven shaft 254 is attached to the heat engine piston 32. The reciprocation of the heat engine piston 32 within the cylinder chamber 34 correspondingly causes the pump piston 250 to reciprocate within the ceramic sleeve 242. The reciprocation of the pump piston 250 provides the pumping action of condensate pump 131 by increasing and decreasing the size of a pumping chamber 255.

The pumping chamber 255 is formed by the bottom surface 253 of the pump piston 250, the inner surface 243 of the ceramic sleeve 242, and a lower portion of the cylindrical cavity 241. During the power stroke of heat engine piston 32, the pump piston 250 will move upwards thereby drawing the condensed liquid from the condenser 102 through the condenser liquid outlet line 140 and inlet 260, and into the pumping chamber 255 (FIG. 7). Furthermore, during the exhaust stroke of heat engine piston 32, the pump piston 250 will move downwards thereby discharging the condensed liquid from the pumping chamber 255 under pressure through outlet 261 to the condensate pump outlet line 142. Check valves 266 and 267 are disposed in inlet 260 and outlet 261, respectively, to facilitate the flow of the condensed liquid in the proper direction by preventing backflow through the inlet 260 and outlet 261. As seen in FIG. 6, because pump piston 250 is at the bottom of its travel, and all of the condensed liquid has been discharged, the pumping chamber 255 has its smallest displacement.

The piston-driven pump condensate pump 141' takes advantage of the energy supplied by the power and exhaust strokes of the heat engine piston 32. However, because the heat engine piston 32 by necessity operates at an elevated temperature, heat is transferred to the pump piston 250 through the driven shaft 254. The heat transferred to the pump piston 250 may cause the condensed liquid drawn into the condensate pump 141' to evaporate. The vapor formed by such evaporation may lead to vapor lock, thus preventing the piston-driven condensate pump 141' from drawing condensed liquid into the pumping chamber 255.

To eliminate this potential problem, the pump piston 250 and pumping chamber 255 must be as cold as or colder than the outlet of the condenser 102 to prevent evaporation of the condensed liquid. To facilitate the prevention of such evaporation, a separate cooling liquid is drawn into and discharged from a cooling chamber 270. The cooling chamber 270 is formed partially by a cylindrical ceramic seal 262 provided in the upper portion of the cylinder cavity 241. The inner surface 263 of the cylindrical ceramic seal 262 is sized to sealingly interface with the driven shaft 254. As seen in FIGS. 6 and 7, the cylindrical ceramic seal 262 in combination with the driven shaft 254, the inner surface 243 of the ceramic sleeve 242, and the top surface 252 of the pump piston 250 form the cooling chamber 270.

Like the pumping chamber 255, the size of the cooling chamber 270 depends on the location of the pump piston 250, and the reciprocation of the pump piston 250 provides pumping action. Furthermore, the cooling chamber 270 communicates via transfer line 271 with the coldest part of the condenser 102. Therefore as the piston reciprocates, cooling liquid from the condenser 102 is drawn through the transfer line 271 and into the cooling chamber 270, and is alternately discharged from the cooling chamber 270 back into the condenser 102. As a result, the cooling liquid is able to remove unwanted heat from the condensate pump 141', and prevent vapor lock by preventing evaporation of the condensed liquid.

To otherwise facilitate the prevention of the aforementioned evaporation, the housing 240 of the piston-driven condensate pump 141' can also be provided with a plurality of fins 272. A fan 273 is provided to direct air toward the condensate pump 141' and preferably fins 272 to effect further removal of unwanted heat.

The operation of either embodiment of the condensate pump 141, 141' discharges the condensed liquid under pressure through a condensate pump outlet line 142 through a vent recouperator 145 of the heat generator 15. The liquid passing through the vent recouperator 145 absorbs heat from the exhaust vapor and passes into a vent recouperator outlet line 146 which passes through a solenoid valve 147 which normally connects the vent recouperator outlet line 146 to the engine recouperator 137 where it derives heat from heat engine exhaust line 72, as described above. Thereafter, an engine recouperator liquid outlet line 140 directs the condensate through the desuperheater 125 where heat is extracted from the compressor high pressure gas line 107 of the compressor section 12. The heated condensate departs desuperheater 125 through a desuperheater liquid outlet line 150 which is connected with the heat generator 15 to bring the fluid back to the starting pressure and temperature in passing through coils 19 of the heat generator 15.

Optionally, the returning liquid condensate in desuperheater outlet line 150 may be further heated prior to introduction into the generator 15. For example, alternate energy assistance may be provided by solar, biogas or other available fuel capable of producing heat. Particularly applicable is the implementation of a solar collector 151 containing one or more solar panels to provide all or a portion of the heat required to operate the heat pump system 10. The solar panels may be interconnected by a temperature controlled solenoid 152 in desuperheater liquid outlet line 150 when heat energy is available from the solar collector 151.

In instances where the outdoor air may be colder than necessary to get the vapor in engine condenser 102 to condense, the thermostatically controlled solenoid valve 147 may be actuated during a utilization of the heating mode of heat pump system 10. When the solenoid valve 147 is actuated in such temperature conditions, the liquid condensate exiting vent recouperator 145 is diverted to a condensate return line 153 connected to the desuperheater liquid outlet line 150 to be reheated in the heat generator 15 and/or solar collector 151.

An alternate mode of employing the vent recouperator 145 is depicted in conjunction with FIG. 2 of the drawings. In that instance, the fluid in the compressor low pressure gas line 112 returning from the indoor evaporator 115 is directed through the vent recouperator 145 before delivery to the compressor 40. This reduces the vent temperature to the temperature of a normal air conditioning furnace while the fluid in compressor low pressure gas lines 112 and 116 gains appreciable heat which results in providing a substantial additional assist through branch low pressure gas supply port 117 to the compressor piston 44 during the power stroke thereof. In the event of this modified flow path, the condensate leaving the condensate pump 141 through condensate pump outlet line 142 goes directly to the engine recouperator 137 and desuperheater 125 rather than through the vent recouperator 145.

Figure 5:
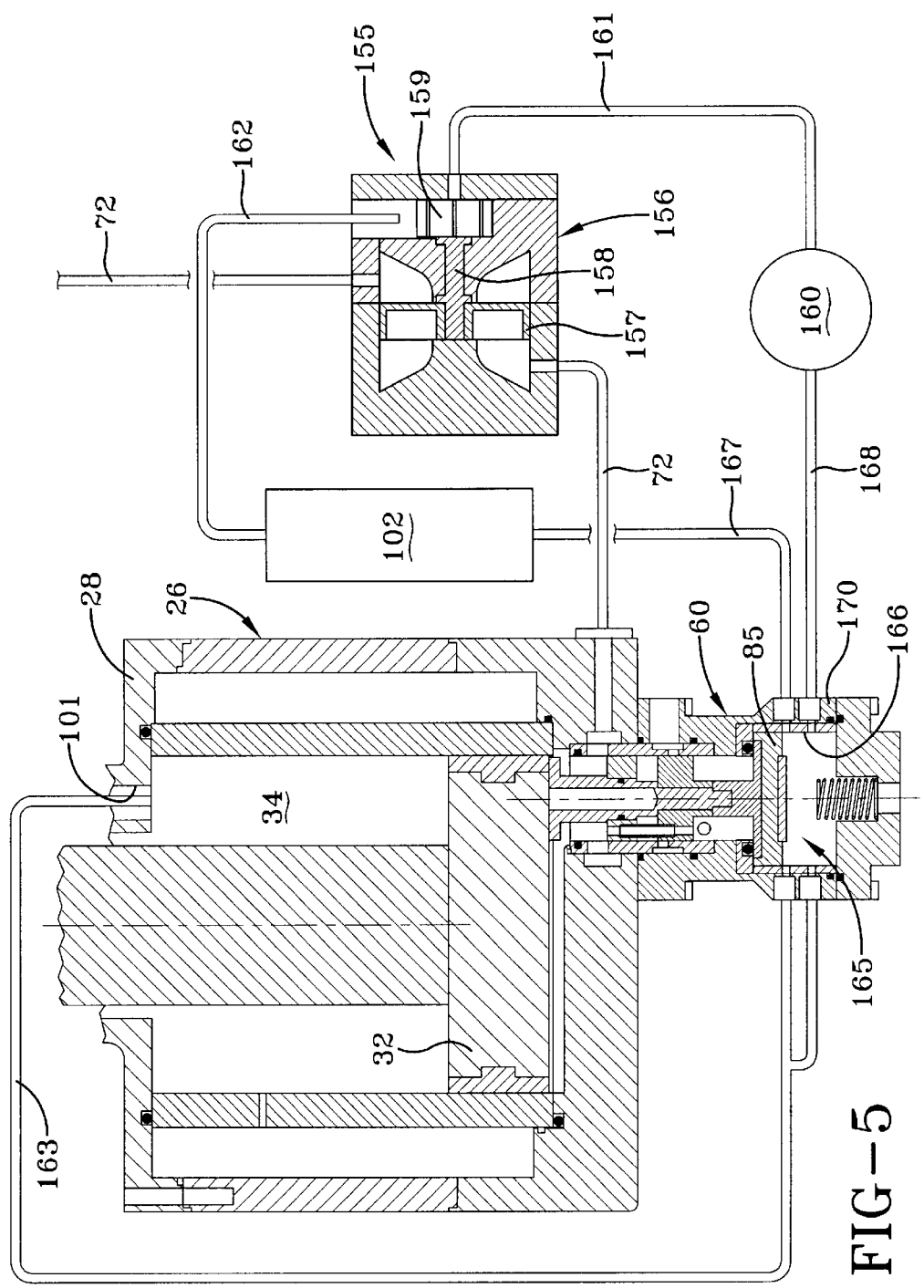
FIG. 5 is an enlarged schematic depiction with portions in cross-section of the heat pump system employing an optional turbo-charger and a modified form of the valve depicted in FIG. 4.

An optional enhancement in the form of a turbo booster, generally indicated by the numeral 155, to improve the efficiency of heat pump system 10 depicted in FIG. 1, is shown in FIG. 5 of the drawings. The turbo booster has a turbine assembly, generally indicated by the numeral 156, interposed in the heat engine exhaust line 72. The turbine assembly 156 has a turbine wheel 157 which is acted upon by the vapor in heat engine exhaust line 72 to rotate it at a high rate of speed. The turbine wheel 157 is rigidly attached to a turbine shaft 158 which nonrotatably carries a turbine vane pump 159 which is preferably of a substantially smaller diameter than the turbine wheel 157 to assure that it can readily drive the vane pump 159. Associated with the turbine assembly 156 is a vacuum tank 160 which is connected to a turbine assembly input line 161 which communicates with the vane pump 159. A turbine assembly output line 162 is connected from the outlet of vane pump and extends to engine condenser 102 which is maintained at an artificial atmospheric pressure which is substantially above the reduced vacuum pressure extant in the vacuum tank 160.

The engine condenser 102 and the vacuum tank 160 are alternately connected to heat engine cylinder chamber 34 above the heat engine piston 32 through outlet port 101 in the upper end cap 28 of heat engine section 26. To this end, a vacuum line 163 extends from the outlet port 101 to a flow selection valve, generally indicated by the numeral 165. The flow selection valve 165 may be advantageously positioned in the lower portion of the valve assembly 60 which operates in the manner described hereinabove. Flow selection valve 165 has a ported valve element 166 which connects either a condenser connect line 167 or vacuum tank connect line 168 with the vacuum line 163. The ported valve element 166 may be conveniently connected to and move with the pilot piston 85 in an extended housing 170 of valve assembly 60. During the entire exhaust stroke of the heat engine piston 32, to and including the position depicted in FIG. 5, the flow selection valve 165 acts to join the condenser connect line 167 to the vacuum line 163, such that condenser pressure is present in heat engine cylinder chamber 34, whereby the pressure to either side of heat engine piston 32 is equalized during the exhaust stroke. During the exhaust stroke, the vacuum tank connect line 168 is disconnected from vacuum line 163 by the flow selection valve 165.

When the valve assembly 60 moves to the power stroke position from the exhaust stroke position, the condenser connect line 167 is disconnected from vacuum line 163 and the vacuum tank connect line 168 is connected to the vacuum line 163 by flow selection valve 165. Thus, during the power stroke the heat engine cylinder chamber 34 is connected to vacuum tank 160. This greatly reduces the back pressure on heat engine piston 32 during the power stroke to thus impart substantially improved efficiency to the operation of the heat engine section 26. The vacuum tank 160 is employed to quickly evacuate engine cylinder chamber 34 immediately upon institution of the power stroke and the related actuation of the flow selection valve 165. It will be appreciated that the turbo booster 155 thus further optimizes use of available energy in the heat pump system 10 to maximize its efficiency.

Figure 8:
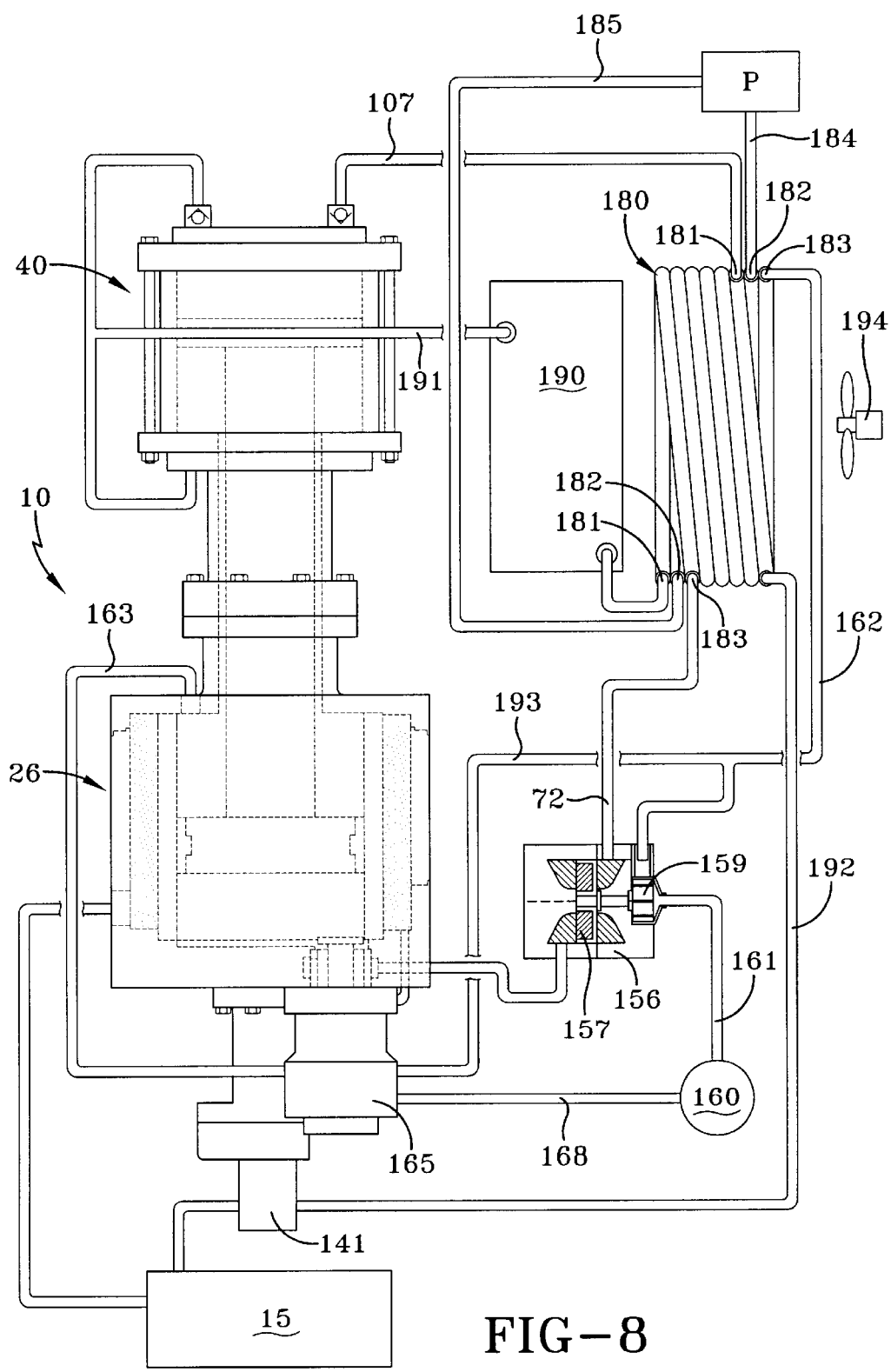
FIG. 8 is a largely schematic depiction of the heat pump system employed in conjunction with a water heating system.

In another embodiment of the invention, the heat pump system 10 could be employed to heat a fluid reservoir such as water contained in one or more of a swimming pool P, hot water heater or the like. As seen in FIG. 8, a heat exchanger, generally indicated by the numeral 180 is used to heat the swimming pool P while simultaneously acting as a condenser to cool the high pressure refrigerant from high pressure exhaust line 107 and the working fluid 18 from heat engine exhaust line 72. The heat exchanger 180 is preferably a triple-tube type with 3 concentric tubes. For example, a first tube 181 is placed inside a second tube 182 which is placed inside a third tube 183. However, for illustrative purposes in FIG. 8, the heat exchanger 180 is shown as having the three tubes placed side-by-side. The first tube 181 is connected to the high pressure gas line 107, and circulates the high pressure refrigerant through the heat exchanger 180. The second or intermediate tube 182 is connected to the swimming pool P via pool outlet line 184 and pool inlet line 185, and circulates water from the swimming pool P through the heat exchanger 180. The third tube 183 is connected to the heat engine exhaust line 72, and circulates the gaseous working fluid 18 through the heat exchanger 180.

As the high pressure refrigerant in the first tube 181 circulates through the heat exchanger 180, the high pressure refrigerant condenses from a gas to a liquid thus giving up the latent heat of condensation to heat exchanger 180. As a result, the latent heat of condensation from the high pressure refrigerant is transferred to the pool water in the second tube 182. Furthermore, the working fluid 18 also transfers its latent heat of condensation to the pool water in second tube 182. For example, the gaseous form of the working fluid 18 is directed to the third tube 183 through the heat engine exhaust line 72. As seen in FIG. 8, the working fluid 18 exits the heat engine section 26, and is directed to the turbine assembly 156 when the turbo booster 155 is optionally utilized. As discussed hereinabove, the working fluid 18 acts on the turbine wheel 157 to rotate it at a high rate of speed, and drive vane pump 159. After exiting the turbine assembly 156, the working fluid 18 is directed to the heat exchanger 180 where it circulates through the third tube 183, and transfers its latent heat of condensation to the pool water in the second tube 182. As the latent heat of condensation is transferred to the pool water, the working fluid in third tube 183 changes from a gas to a liquid.

Like the configuration depicted in FIG. 5, when using the turbo booster 155, the flow selection valve 165 controls the movement of the working fluid 18 into and out of the heat engine cylinder chamber 34 corresponding to the exhaust and power strokes of the heat pump system 10. During the power stroke, the working fluid 18 from the heat engine cylinder chamber 34 is directed by the flow selection valve 165 to a return line 193, and the third tube 183. Furthermore, during the power stroke, the working fluid from the return line 193 is directed by the flow selection valve 165 to the heat engine cylinder chamber 34. As discussed hereinabove, movement of the working fluid 18 into and out of the heat engine cylinder chamber improves the efficiency of the heat pump system 10.

For purposes of discussion, movement of the working fluid 18 begins during the power stroke. For example, the flow selection valve 165 connects the vacuum line 163 with the vacuum tank control line 162 to remove the working fluid 18 from the heat engine cylinder chamber 34. As the working fluid flows through the flow selection valve 165, the working fluid 18 is directed through the vacuum tank control line 162, the vacuum tank 160, and the turbine assembly input line 161. The vane pump 159 subsequently pumps the working fluid 18 via the turbine assembly output line 162 into the return line 193. The return line 193 is filled with the working fluid 18 to provide a fluid connection between the return line 193 and the flow selection valve 165 during the exhaust stroke.

After filling the return line 193, any excess working fluid 18 is directed to the third tube 183. In addition to circulating working fluid 18 through the heat exchanger 180, the third tube 183 is used to store working fluid 18. For example, the turbine assembly output line 162 is attached to the third tube 183 upstream of where the working fluid 18 circulates between the heat engine exhaust line 72 and the liquid outlet line 192 as will be discussed hereinbelow. As such, there is space in the third tube 183 to store the working fluid 18 after the return line 193 has been filled.

Movement of the working fluid 18 ends during the power stroke. For example, the flow selection valve 165 connects the vacuum line with the return line 193 to fill heat engine cylinder chamber 34 with working fluid 18. As the working fluid 18 flows through the flow selection valve 165, the working fluid is drained from the third tube 183 until the heat engine cylinder chamber 34 is filled, and the process begins again.

As discussed hereinabove, the heat exchanger 180 acts as a condenser by simultaneously heating the pool water, and cooling the high pressure refrigerant in first tube 181 and the gaseous working fluid 18 in third tube 183. As a result, the need for a conventional condenser is eliminated. However, an evaporator 190 and the heat generator 15 are necessary to complete the vapor compression cycle and Rankin cycle, respectively. For example, the high pressure refrigerant exits the heat exchanger 180 as a liquid, and is directed to the evaporator 190 before it returns to the compressor 40 as a gas through low pressure gas line 191. Furthermore, the evaporator 190 is in part heated by a fan 194 which blows air warmed by excess heat from the triple-tube heat exchanger 180. In addition, the working fluid 18 exits the heat exchanger 180 as a liquid, and is directed via liquid outlet line 192 to the condensate pump 141. The condensate pump 141 ultimately pumps the working fluid 18 to the heat generator 15 in order to return it to the heat engine section 26 as a gas.

Thus, it should be evident that the heat pump system disclosed herein carries out one or more of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. A heat pump system comprising, a heat engine having a heat engine cylinder chamber and a heat engine piston movable therein, a valve assembly having a valve stem, an inlet control piston on said valve stem movable to selectively connect said heat engine cylinder chamber to one side of said heat engine piston with a high temperature pressurized working fluid source for the power stroke of said heat engine piston and with a heat engine exhaust line during the exhaust stroke of said heat engine piston, and a pilot piston on said valve stem for moving said inlet control piston to institute the exhaust stroke of said heat engine piston.

2. A heat pump system according to claim 1, wherein said valve assembly has a flow control gate attached to said valve stem, said flow control gate extending into said heat engine cylinder chamber during the exhaust stroke of said heat engine piston and retracting therefrom during the power stroke of said heat engine piston.

3. A heat pump system according to claim 2, wherein said flow control gate is engaged by said heat engine piston and retracted to place the inlet control piston in the power stroke position at the end of the exhaust stroke.

4. A heat pump system according to claim 3, wherein said pilot piston is magnetically retained when said inlet control piston is in the exhaust stroke position until said heat engine piston engages said flow control gate and moves said valve stem.

5. A heat pump system according to claim 4, wherein a spring acting on said pilot piston slows the movement thereof when said magnetic retention is overcome by said heat engine piston.

6. A heat pump system according to claim 5, wherein a bumper block carried by said pilot piston cushions arrival of said pilot piston at the power stroke position.

7. A heat pump system according to claim 1, wherein a bumper cushions the arrival of said pilot piston in the exhaust stroke position.

8. A heat pump system according to claim 1, wherein a port in said heat engine cylinder chamber communicates with said pilot piston at the end of the power stroke, and said pilot piston has a greater surface area than said flow control gate, whereby the exhaust pressure in said heat engine cylinder chamber moves said flow control gate and said inlet control piston to the exhaust stroke position.

9. A heat pump system according to claim 1 further comprising, a compressor having a compressor piston connected to said heat engine piston with said compressor piston powering said heat engine piston during the exhaust stroke of said heat engine piston.

10. A heat pump system according to claim 1, wherein a lockup line connects said heat engine cylinder chamber with said pilot piston to maintain said pilot piston in the exhaust stroke position during the exhaust stroke.

* * * * *